United States Patent [19]

Erickson et al.

[11] 4,273,509
[45] Jun. 16, 1981

[54] SELF-POWERED CLEANING UNIT FOR A FLUID PUMP

[75] Inventors: John W. Erickson, Huntington Beach; F. Barton Brown, La Crescenta; Thomas A. White, Jr., Redondo Beach, all of Calif.

[73] Assignee: Kobe, Inc., City of Commerce, Calif.

[21] Appl. No.: 32,035

[22] Filed: Apr. 23, 1979

[51] Int. Cl.³ .................... F01M 1/10; B01D 33/10
[52] U.S. Cl. ............................ 415/111; 60/454; 184/6.24; 210/360.2; 210/380.1; 210/416.5
[58] Field of Search .............. 415/111, 121 R, 121 A; 210/360 R, 369, 380 R, 381, 402, 416 L; 184/6.24; 60/453, 454

[56] References Cited

U.S. PATENT DOCUMENTS

| | | | |
|---|---|---|---|
| 1,570,285 | 1/1926 | Schleyer | 415/111 X |
| 2,678,133 | 5/1954 | Thayer et al. | 210/360 A |
| 2,720,313 | 10/1955 | Pattison | 210/360 R X |
| 2,959,008 | 11/1960 | Caroli | 60/453 X |
| 3,257,957 | 6/1966 | Tracy | 415/121 R X |
| 3,655,058 | 4/1972 | Novak | 210/360 A |

FOREIGN PATENT DOCUMENTS

| | | | |
|---|---|---|---|
| 274945 | 6/1914 | Fed. Rep. of Germany | 210/380 |
| 1166555 | 3/1964 | Fed. Rep. of Germany | 184/6.24 |

Primary Examiner—Leonard E. Smith
Attorney, Agent, or Firm—William C. Norvell, Jr.

[57] ABSTRACT

The invention relates to a cleaning unit for power driven pumps which are required to pump fluids containing significant quantities of particulate material of greater spcific gravity than the fluid. A portion of the pressured fluid output of the pump is utilized to drive a fluid motor which in turn rotatably drives a centrifugal separator. The separator has its inlet connected to the source of particulate containing fluid and effects the centrifugal separation of such fluid into two streams, respectively a clean fluid stream and a particulate containing stream. Means are provided for discharging the particulate containing stream and a diffuser means is provided for converting the rotational energy in the clean fluid stream into a pressure head which is employed to transfer the clean fluid to the inlet of the pump.

13 Claims, 2 Drawing Figures

SELF-POWERED CLEANING UNIT FOR A FLUID PUMP

CROSS-REFERENCE TO RELATED APPLICATION AND PATENTS

This application is related in subject matter to copending application Ser. No. 4566, filed Jan. 18, 1979, entitled "Downhole Cleaner Assembly For Cleansing Lubricant Of Downhole Turbo-Machines Within Wells", and assigned to the same assignee as this application.

This application also is related in subject matter to: U.S. Pat. No. 4,047,581, issued Sept. 13, 1977, entitled "Multistage, Downhole, Turbo-Powered Intensifier For Drilling Petroleum Wells"; and to U.S. Pat. No. 4,103,749, issued Aug. 1, 1978, entitled "Downhole Cleaner Assembly For Petroleum Wells", each of said patents being assigned to the same assignee as this application.

BACKGROUND OF THE INVENTION

1. Field of the Invention

The invention is applicable to any type of fluid pump which is required to pump fluids containing significant quantities of particulate material having a specific gravity in excess of that of the fluid. This condition occurs in literally hundreds of industrial applications and is often encountered in the circulation of drilling fluids used in the drilling, completion and workover of subterranean wells. The separation of the particulate material from the fluid prior to its entry into the pump is particularly desirable because of the elimination of excessive wear of the pump components.

2. Description of the Prior Art

There are, of course, numerous apparatuses available for effecting the removal of particulate material from a fluid. Such prior art apparatuses, however, generally require a separate pump or motor to provide the power required to effect the separation of the particulate. This necessarily requires the provision of additional electric or fluid power sources and appropriate controls for operating the cleaning apparatus as an entity separate from the pump to which the clean fluid is to be supplied. Prior art apparatuses do not contemplate that the fluid energy produced by the pump could be employed to actuate a particulate separator, thus providing a self-powered cleaning unit for the pump.

SUMMARY OF THE INVENTION

This invention contemplates the disposition of a fluid operated motor or turbine in the discharge path of the pressured fluid generated by the pump for which clean fluid is desired. In accordance with this invention, such fluid motor forms part of an integral apparatus including a centrifugal separator, a centrifugal pump for supplying particulate containing fluid to the separator, and a vane-type diffuser for recovering the rotational energy of the clean fluid stream produced by the centrifugal separator. Additionally, the pressurized clean fluid produced by the separator may be employed to supply lubricating fluid to fluid-type bearings employed in the assemblage, thus reducing bearing wear and erosion. The pressurized clean fluid stream emerging from the centrifugal separator is directed to the fluid inlet of the pump and the particulate containing stream produced by the centrifugal separator is separately discharged to waste or a separate fluid recovery unit, if the value of the fluid warrants the employment of such additional mechanism.

DESCRIPTION OF THE PREFERRED EMBODIMENTS

Figures 1, 2:
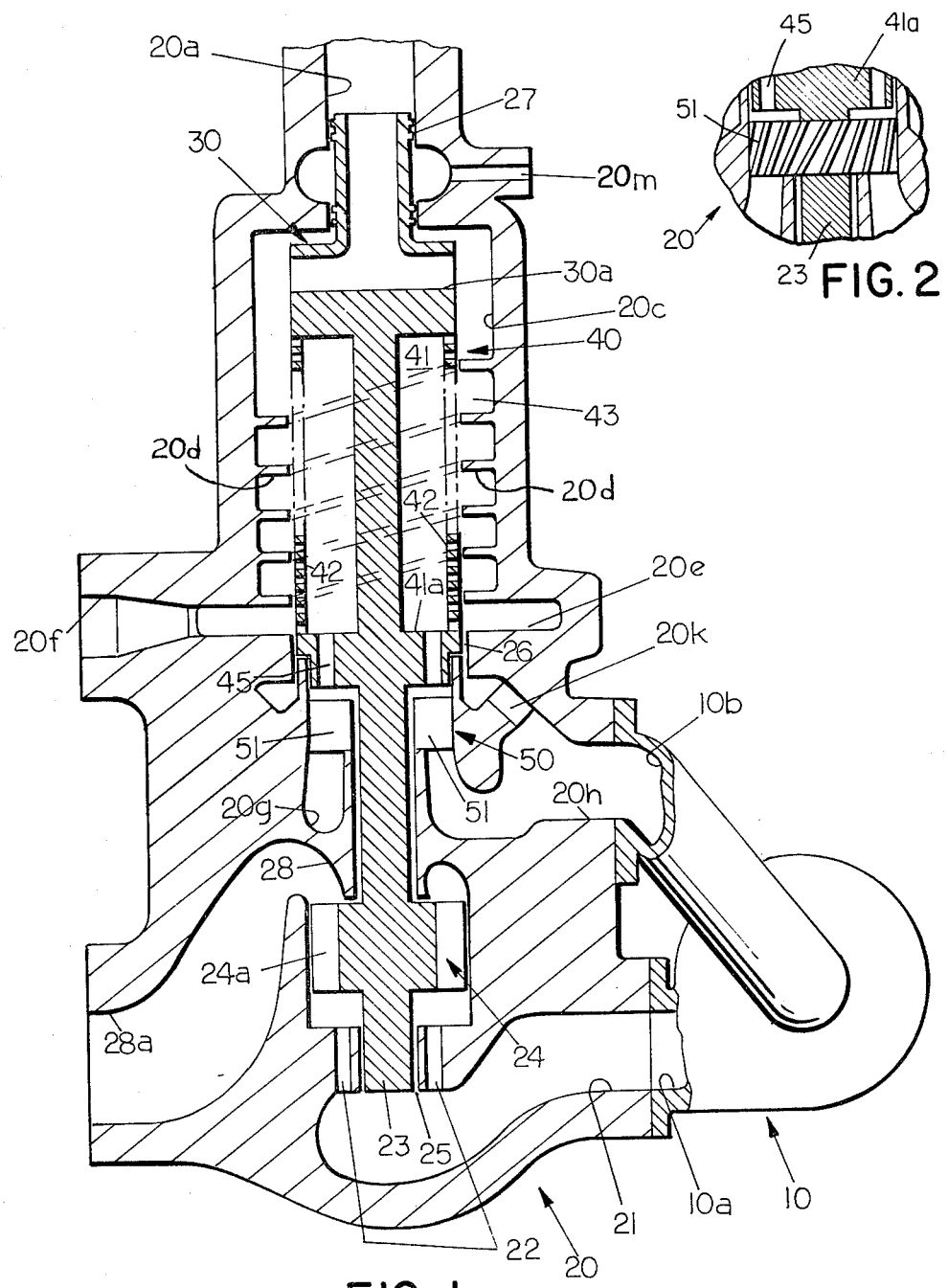
FIG. 1 represents a schematic sectional view of a self-powered particulate cleaning attachment for a fluid pressure pump.
FIG. 2 is a partial sectional view of FIG. 1 with the diffuser shown in elevation.

The numeral 10 represents any form of fluid pump, usable for industrial purposes, having a pressured fluid discharge opening 10a and an inlet conduit 10b for receiving the fluid to be subjected to the pumping action. In accordance with the preferred embodiment of this invention, both the pump discharge conduit 10a and the pump inlet conduit 10b are connected to a housing 20 within which is mounted a self-contained fluid cleaning unit capable of effecting the separation of particulates contained in the fluid, particularly those which are of higher specific gravity than the fluid to be pumped, such as sand. The discharge outlet 10a of pump 10 communicates directly with a conduit 21 defined in cleaning unit housing 20 and the pressured fluid is directed by conduit 21 to a fluid pressure rotary motor 24. For example, a plurality of axial nozzles 22 are provided which are peripherally spaced about the axis of an elongated shaft 23 having turbine blades 24a mounted thereon in a position to be impacted by the pressurized fluid discharged through nozzles 22, and hence effecting the rotation of the shaft 23. This results in only a small, tolerable drop in pressure of the fluid output of pump 10. Since the drawing is only schematic in nature, the details of the bearings for rotatably supporting the shaft 23 are not shown therein but it is contemplated that fluid-type bearings could be conveniently employed at the locations in housing 20 indicated by the numerals 25, 26 and 27 respectively.

The pressured fluid exiting from the turbine blades 24a passes into an annular discharge conduit 28 which in turn connects to conduit 28a for connection to whatever apparatus, transmission line or storage vessel for which the pressured fluid is intended.

The other axial end of turbine-driven shaft 23 incorporates and drives a centrifugal pump 30, the function of which is to draw particulate containing fluid through an axial inlet opening 20a in the housing 20 from a source of such fluid, and, by virtue of the rotation of the pump 30, a significant rotational velocity is imparted to the particulate containing fluid.

Immediately adjacent the output 30a of the centrifugal pump 30 there is provided a centrifugal separator 40 comprising an annular rotating internal chamber 41 defined between the shaft 23 and a perforated wall 42, and an outer separation chamber 43 defined between the internal wall 20c of housing 20 and the exterior surface of the perforated wall 42. As is well known to those skilled in the art, the fact that the particulate containing fluid enters the outer chamber 43 with a significant rotational velocity causes those particulates which are of a higher specific gravity than the fluid itself, or which are larger than the holes in perforated wall 42, to be concentrated in the outer chamber 43, while the remainder of the fluid flows into the inner chamber 41 and thus effects the separation of the particulate containing fluid into two rotating streams, one stream comprising relatively clean fluid and the other having a high concentration of particulate entrained therein.

To facilitate the discharge of the particulate containing stream, a spiral vane 20d is provided on the interior surface of the housing wall 20c to aid in directing the trapped particulate matter to an annular discharge chamber 20e formed in the housing 20 which in turn communicates with a discharge outlet 20f.

The axially inward end wall 41a of the inner chamber 41 may conveniently be defined by a radially enlarged integral portion of the shaft 23. This wall is provided with a plurality of circularly spaced nozzles 45 through which the clean fluid flows. Since both the fluid and the nozzles 45 are rotating, the clean fluid comes out of the other end of the nozzles 45 with significant rotational velocity and this velocity is converted by a diffuser 50 into a pressure head. By way of example, diffuser 50 may comprise a plurality of fixed blades 51 which are peripherally disposed around the shaft 23 and angularly aligned with the nozzles 45 so as to be impacted by the clean fluid being discharged through said nozzles, thus converting the rotational energy of the fluid into a pressure head. An annular collecting chamber 20g is formed in the housing 20 on the other side of the diffuser blades 51 and chamber 20g in turn connects with a clean fluid discharge outlet 20h to which the fluid inlet 10b of the pump 10 is connected.

As previously mentioned, it is convenient, particularly when the entrained particulate material is of an abrasive nature, to employ fluid bearings in the described cleaning apparatus. Pressurized cleaned fluid is supplied to each of said bearings. For example, the bearing 25 is directly disposed in the path of the discharged cleaned fluid from the pump 10. Bearing 26 is supplied by an internal passage 20k formed in the housing 20. Lastly, fluid bearing 27 is supplied by suitable piping (not shown) through a conduit 20m provided in the housing 20. It is thereby assured that the particulate containing fluid will not be permitted to enter the fluid bearings 25, 26 or 27 and the life of such bearings is thereby substantially increased.

Another feature of the separator is the ability to separate organic solids of the same specific gravity as the liquid by making the perforations in the perforated wall 42 comparatively small such that the wall 42 will act as a filter. The interaction of the helical elements 20d and perforated wall 42 thus provide a self-cleaning function with respect to organic solids.

Another method contemplated within the invention is the back washing of the separator cylinder, in such instance the vanes 20d will not be necessary. The source of the back wash could be the pump 10.

The described invention provides a self-containing, self-powered cleaning unit for any type of pump required to pump fluids containing significant amounts of particulate material. No separate power sources or controls are required to actuate the cleaning unit and it is effective whenever the pump is operated.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A method of lubricating fluid bearings employed in a pumping apparatus required to pump fluid containing a significant quantity of particulates, comprising the steps of: imparting a rotational movement to the fluid containing particulates to separate such fluid into two radially distinct rotating streams, the outer stream containing most of the particulates and the inner stream being relatively free of particulates; directing the inner stream against stationary vane means to convert the rotational energy of the rotating inner stream into a pressure head; and applying a portion of the pressurized relatively clean fluid stream to lubricate the fluid bearings.

2. In a pumping apparatus for fluids containing particulate matter, said apparatus having fluid lubricated bearings, the improvement comprising: a rotary pump disposed at the inlet end of the pumping apparatus and arranged to impart a high velocity rotation to the fluid containing particulates; a generally cylindrical separator chamber into which said high velocity particulate containing fluid is introduced, thereby effecting the separation of said particulate containing fluid into two axially and rotatably flowing streams; a radially outer stream containing most of the particulates and a radially inner stream being relatively free of particulates; stationary vane means for converting the rotational energy of the inner particulate stream into a pressure head; and conduit means for conducting a portion of the pressurized relatively clean fluid to the fluid bearings of the pumping apparatus.

3. A self-powered cleaning unit for a power driven pump required to pump fluids containing significant quantities of particulate material of greater specific gravity than the fluid, comprising: a fluid pressure motor in fluid communication with the pressured fluid outlet of the pump; a centrifugal separator rotatably driven by said fluid motor; means connecting the inlet of said centrifugal separator with the source of particulate containing fluid, whereby such fluid is divided into a rotating clean fluid stream and a rotating particulate containing stream; means for discharging the particulate containing stream from the separator; stationary vane means for converting the rotational energy of the clean fluid stream to a pressure head; and conduit means for directing the pressurized clean fluid to the fluid inlet of the pump.

4. The combination defined in claim 2 or 3 wherein said separator comprises an inner rotating annular chamber driven by said fluid pressure motor and having a perforated cylindrical outer wall to permit flow of clean fluid therein and a stationary annular outer chamber into which the particulate content having a specific gravity substantially equal to that of the fluid is retained by screening action defined by the diameter of the perforations in the cylindrical wall, spiral vanes on the wall of said outer chamber, the particulate content being dislodged from the cylindrical wall by the spiral flow produced by said spiral vanes in the outer chamber and being transferred by the spiral vanes to the discharge of the separator.

5. The combination defined in claim 2 or 3 wherein said stationary vane means for converting the rotational energy of the clean fluid stream into a pressure head comprises a plurality of circularly spaced, axially directed nozzles formed in said separator in the path of the clean fluid stream, and a circular array of stationary vanes disposed in alignment with the discharge ends of said nozzles and being angularly disposed relative to the clean fluid impinging thereon to create said pressure head.

6. A self-powered cleaning unit for a power driven pump required to pump fluids containing significant quantities of particulate material, comprising: a fluid pressure motor in fluid communication with the pressured fluid outlet of the pump; said fluid pressure motor consuming a minor portion of the fluid pressure output of said pump; a separator rotatably driven by said fluid motor; means connecting the inlet of said separator with the source of particulate containing fluid, whereby such fluid is divided into a rotating clean fluid stream and a rotating particulate containing stream; means for discharging the particulate containing stream from the separator; and a conduit means for directing the pressurized clean fluid to the fluid inlet of the pump, said pressurized clean fluid constituting the entire fluid input to said pump.

7. The combination defined in claim 6 wherein said fluid pressure motor comprises an axial flow turbine disposed in the path of fluid discharged by the pump.

8. The combination defined in claim 6 wherein said separator is journaled in a housing by fluid bearings, and means for supplying pressurized clean fluid produced by said separator to said fluid bearings.

9. The combination of claim 6 further comprising means for converting the rotational energy of the clean fluid stream to a pressure head.

10. The combination defined in claim 6 wherein said separator includes a centrifugal pump driven by said fluid pressure motor and connected between said separator and the source of particulate containing fluid, thereby supplying the particulate containing fluid to the separator with a high rotational velocity.

11. The combination defined in claim 6 wherein said separator comprises an inner rotating annular chamber driven by said fluid pressure motor and having a perforated cylindrical outer wall to permit flow of clean fluid therein and a stationary annular outer chamber into which the particulate content of the fluid is directed by centrifugal force, said outer chamber having spiral vanes on the outer wall thereof to direct the particulate containing stream to said discharging means.

12. The combination defined in claim 10 wherein said separator comprises an inner rotating annular chamber driven by said fluid pressure motor and having a perforated cylindrical outer wall to permit flow of clean fluid therein and a stationary annular outer chamber into which the particulate content of the fluid is directed by centrifugal force, said outer chamber having spiral vanes on the outer wall thereof to direct the particulate containing stream to said discharging means, and the end wall of said inner chamber having openings therein to discharge the clean fluid.

13. The combination defined in claim 11 or 12 wherein said inner rotating annular chamber of said separator has a radial end wall, said end wall defining a plurality of circularly spaced, axially directed nozzles to discharge the clean fluid therefrom, and a circular array of stationary vanes disposed in alignment with the discharge ends of said nozzles and being angularly disposed relative to the clean fluid impinging thereon to create a pressure head.

* * * * *